United States Patent

Yana Motta et al.

(10) Patent No.: US 9,994,749 B2
(45) Date of Patent: *Jun. 12, 2018

(54) COMPOSITIONS AND METHODS FOR REFRIGERATION

(71) Applicant: HONEYWELL INTERNATIONAL INC., Morristown, NJ (US)

(72) Inventors: Samuel F Yana Motta, East Amherst, NY (US); Mark W Spatz, East Amherst, NY (US); Rajiv Ratna Singh, Getzville, NY (US); Robert Gerard Richard, Hamburg, NY (US); Elizabet del Carmen Vera Becerra, Williamsville, NY (US); Daniel Burger, Hamburg, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/604,929

(22) Filed: Jan. 26, 2015

(65) Prior Publication Data

US 2015/0144306 A1    May 28, 2015

Related U.S. Application Data

(60) Division of application No. 12/776,320, filed on May 7, 2010, now Pat. No. 8,974,688, which is a (Continued)

(51) Int. Cl.
| | |
|---|---|
| *C09K 5/04* | (2006.01) |
| *C09K 3/30* | (2006.01) |
| *F25B 1/00* | (2006.01) |
| *F28D 1/00* | (2006.01) |
| *F25B 40/00* | (2006.01) |

(52) U.S. Cl.
CPC ............... *C09K 5/045* (2013.01); *C09K 3/30* (2013.01); *F25B 1/00* (2013.01); *F28D 1/00* (2013.01); *C09K 2205/126* (2013.01); *C09K 2205/22* (2013.01); *C09K 2205/40* (2013.01); *F25B 40/00* (2013.01); *F25B 2400/121* (2013.01); *F25B 2400/18* (2013.01)

(58) Field of Classification Search
CPC .............. C09K 5/045; C09K 2205/126; C09K 2205/22
See application file for complete search history.

(56) References Cited

U.S. PATENT DOCUMENTS

| | | | |
|---|---|---|---|
| 8,974,688 B2* | 3/2015 | Yana Motta | C09K 3/30 252/67 |
| 2008/0069177 A1* | 3/2008 | Minor | C09K 5/045 374/4 |
| 2010/0122545 A1* | 5/2010 | Minor | C08J 9/146 62/324.1 |

FOREIGN PATENT DOCUMENTS

WO    WO 2010/059677    *   5/2010

* cited by examiner

*Primary Examiner* — John R Hardee
(74) *Attorney, Agent, or Firm* — Colleen D. Szuch (57) ABSTRACT

Heat transfer systems, methods and compositions which utilize a heat transfer fluid comprising: (a) from about 30% to about 65% by weight of HFC-134a; (b) from about 0% to about 70% by weight of HFO1234ze; and (c) from about 0% to about 70% by weight of HFO-1234yf, provided that the amount of HFO-1234ze and HFO-1234yf in the composition together is at least about 35% by weight, with the weight percent being based on the total of the components (a)-(c) in the composition.

12 Claims, 1 Drawing Sheet

Related U.S. Application Data continuation-in-part of application No. 12/511,954, filed on Jul. 29, 2009, now abandoned.

(60) Provisional application No. 61/240,786, filed on Sep. 9, 2009, provisional application No. 61/247,816, filed on Oct. 1, 2009.

COMPOSITIONS AND METHODS FOR REFRIGERATION

CROSS REFERENCES TO RELATED APPLICATIONS

The present application is a divisional of U.S. application Ser. No. 12/776,320, filed May 7, 2010, now U.S. Pat. No. 8,974,688, which application is related to and claims the priority benefit of each of U.S. Provisional Application Ser. Nos. 61/240,786, filed Sep. 9, 2009 and 61/247,816, filed Oct. 1, 2009, and is a continuation-in-part of U.S. application Ser. No. 12/511,954, now abandoned, filed Jul. 29, 2009, each of which is incorporated in its entirety herein by reference.

FIELD OF THE INVENTION

This invention relates to compositions, methods and systems having utility in many applications, including in domestic and small refrigeration and/or air conditioning applications and/or heat pump applications, and in particular aspects to refrigerant compositions for replacement of refrigerant HFC-134a for heating and/or cooling applications and to retrofitting refrigerant and/or air conditioning systems, including systems designed for use with HFC-134a.

BACKGROUND

Mechanical refrigeration systems, and related heat transfer devices such as heat pumps and air conditioners, using refrigerant liquids are well known in the art for industrial, commercial and domestic uses. Fluorocarbon based fluids have found widespread use in many residential, commercial and industrial applications, including as the working fluid in systems such as air conditioning, heat pump and refrigeration systems, including relatively small systems such as are used for domestic refrigerators and freezers and in automobile air conditioning. Because of certain suspected environmental problems, including the relatively high global warming potentials, associated with the use of some of the compositions that have heretofore been used in these applications, it has become increasingly desirable to use fluids having low or even zero ozone depletion potential, such as hydrofluorocarbons ("HFCs"). For example, a number of governments have signed the Kyoto Protocol to protect the global environment and setting forth a reduction of CO2 emissions (global warming). Thus, there is a need for a low- or non-flammable, non-toxic alternative to replace certain of high global warming HFCs.

One important type of refrigeration system is known as "small refrigeration" or "domestic refrigeration" systems, which encompasses systems that are typically used in residential homes, apartments and the like for consumer use in refrigerators, freezers, and the like. Also frequently included in this group are vending machines and the like. Another important refrigeration system comprises automotive air conditioning systems. In such refrigeration systems a commonly used refrigerant liquid has been HFC-134a, also known as R-134a.

There has thus been an increasing need for new fluorocarbon and hydrofluorocarbon compounds and compositions that are attractive alternatives to the compositions heretofore used in these and other applications. For example, it has become desirable to retrofit chlorine-containing refrigeration systems by replacing chlorine-containing refrigerants with non-chlorine-containing refrigerant compounds that will not deplete the ozone layer, such as hydrofluorocarbons (HFC's). Industry in general and the heat transfer industry in particular are continually seeking new fluorocarbon based mixtures that offer alternatives to, and are considered environmentally safer substitutes for, CFCs and HCFCs. It is generally considered important, however, at least with respect to heat transfer fluids, that any potential substitute must also possess those properties present in many of the most widely used fluids, such as excellent heat transfer properties, chemical stability, low- or no-toxicity, non-flammability and/or lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirably for CFC refrigerant substitutes to be effective without major engineering changes to conventional vapor compression technology currently used with CFC refrigerants.

Flammability is another important property for many applications. That is, it is considered either important or essential in many applications, including particularly in heat transfer applications, to use compositions which are non-flammable. Thus, it is frequently beneficial to use in such compositions compounds which are nonflammable. As used herein, the term "nonflammable" refers to compounds or compositions which are determined to be in Class 1 as determined in accordance with ASHRAE Standard 34-2007, including ANSI/ASHRI Addenda, which is incorporated herein by reference. Unfortunately, many HFC's which might otherwise be desirable for used in refrigerant compositions are not nonflammable and/or not Class 1. For example, the fluoroalkane difluoroethane (HFC-152a) and the fluoroalkene 1,1,1-trifluorpropene (HFO-1243zf) are each flammable and therefore not viable for use in many applications.

Applicants have thus come to appreciate a need for compositions, systems, and methods and particularly heat transfer compositions that are highly advantageous in vapor compression heating and cooling systems and methods, particularly refrigerant and heat pump systems of the type that have heretofore been used with or designed for use with HFC-134a.

SUMMARY

Applicants have found that the above-noted need, and other needs, can be satisfied by compositions, methods and systems which comprise or utilize a multi-component mixture which comprises HFC-134a and at least one fluorinated olefin selected from the group consisting of HFO-1234ze and HFO-1234yf.

In preferred embodiments, the compositions of the present invention comprise: (a) from about 30% to about 65% by weight of HFC-134a; (b) from about 0% to about 70% by weight of HFO-1234ze, preferably trans-HFO-1234ze; and (c) from about 0% to about 70% by weight of HFO-1234yf, provided that the amount of HFO-1234ze plus HFO-1234yf in the composition is at least about 35% by weight, with the weight percent being based on the total of the components (a)-(c) in the composition. Applicants have unexpectedly found the combination of components in the present compositions, especially within the preferred ranges specified herein, are capable of at once achieving a combination of important and difficult to achieve refrigerant performance properties that cannot be achieved by any one of the components alone. For example, the preferred compositions of the present invention are at once Class 1 with respect to flammability and have a desirably low GWP.

If the amount of HFC-134 is greater than the preferred range identified above, for example, the composition will not satisfy the environmental requirements for many applications. On the other hand, if the fluorinated olefins are used in amounts greater than those specified above, the composition will not be Class 1 and/or will not perform acceptable in terms of capacity and/or efficiency.

In certain preferred embodiments, the compositions comprise a multi-component mixture comprising: (a) from about 35% to about 55% by weight of HFC-134a; (b) from about 30% to about 60% by weight of HFO-1234ze, preferably trans-HFO-1234ze; and (c) from about 5% to about 30% by weight of HFO-1234yf, with the weight percent being based on the total of the components (a)-(c) in the composition.

In certain preferred embodiments, particularly for use in connection with systems that have heretofore utilized HFC-134a as the refrigerant, the present compositions comprise a multi-component mixture comprising: (a) from about 35% to about 50% by weight of HFC-134a; (b) from about 30% to about 55% by weight of HFO-1234ze, preferably trans-HFO-1234ze; and (c) from about 5% to about 25% by weight of HFO-1234yf, with the weight percent being based on the total of the components (a)-(c) in the composition. In even more preferred embodiments, the compositions comprise a multi-component mixture comprising: (a) from about 40% to about 45% by weight of HFC-134a; (b) from about 35% to about 50% by weight of HFO-1234ze, preferably trans-HFO-1234ze; and (c) from about 10% to about 20% by weight of HFO-1234yf, with the weight percent being based on the total of the components (a)-(c) in the composition. Applicants have found that such preferred compositions are highly desirable in that they are not only low GWP and Class 1 compositions, but they also are capable of exhibiting in many refrigeration applications energy consumption properties that are equal to or superior to the energy consumption of HFC-134a, preferably as measured in accordance with American National Standard "Energy Performance and Capacity of Household Refrigerators, Refrigerator-Freezers and Freezers (ANSI/AHAM HRF-1-2007), which is incorporated herein by reference.

In certain preferred embodiments, the present compositions may also include HFO-1233, preferably in amounts of up to about 5% by weight of the composition.

The present invention provides also methods and systems which utilize the compositions of the present invention, including methods and systems for heat transfer and for retrofitting existing heat transfer systems. Certain preferred method aspects of the present invention relate to methods of providing cooling in small refrigeration systems. Other method aspects of the present invention provide methods of retrofitting an existing small refrigeration system designed to contain or containing R-134a refrigerant comprising introducing a composition of the present invention into the system without substantial engineering modification of said existing refrigeration system.

The term "HFO-1234" is used herein to refer to all tetrafluoropropenes. Among the tetrafluoropropenes are included 1,1,1,2-tetrafluoropropene (HFO-1234yf) and both cis- and trans-1,1,1,3-tetrafluoropropene (HFO-1234ze). The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these.

The term "HFO-1233" is used herein to refer to all trifluoro,monochloropropenes. Among the trifluoro,monochloropropenes are included 1,1,1,trifluoro-2,chloro-propene (HFCO-1233xf), both cis- and trans-1,1,1-trifluo-3, chlororopropene (HFCO-1233zd). The term HFCO-1233zd is used herein generically to refer to 1,1,1-trifluo-3,chloropropene, independent of whether it is the cis- or trans-form. The terms "cisHFCO-1233zd" and "transHFCO-1233zd" are used herein to describe the cis- and trans-forms of 1,1,1-trifluo,3-chlororopropene, respectively. The term "HFCO-1233zd" therefore includes within its scope cisHFCO-1233zd, transHFCO-1233zd, and all combinations and mixtures of these.

The term "HFC-134a" is used herein to refer to 1,1,1,2-tetrafluoroethane.

DETAILED DESCRIPTION OF PREFERRED EMBODIMENTS

Small refrigeration systems are important in many applications, as mentioned above. In such systems, one of the refrigerant liquids which has been commonly used has been HFC-134a, which has an estimated high Global Warming Potential (GWP) of 1430. Applicants have found that the compositions of the present invention satisfy in an exceptional and unexpected way the need for alternatives and/or replacements for refrigerants in such applications, particularly and preferably HFC-134a. Preferred compositions at once have lower GWP values and provide non-flammable, non-toxic fluids that have a close match in cooling capacity to HFC-134a in such systems.

In certain preferred forms, compositions of the present invention have a Global Warming Potential (GWP) of not greater than about 1000, more preferably not greater than about 700, and even more preferably about 600 or less. As used herein, "GWP" is measured relative to that of carbon dioxide and over a 100 year time horizon, as defined in "The Scientific Assessment of Ozone Depletion, 2002, a report of the World Meteorological Association's Global Ozone Research and Monitoring Project," which is incorporated herein by reference.

In certain preferred forms, the present compositions also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Heat Transfer Compositions

The compositions of the present invention are generally adaptable for use in heat transfer applications, that is, as a heating and/or cooling medium, but are particularly well adapted for use, as mentioned above, in small refrigeration systems that have heretofor used HFC-134a.

Applicants have found that use of the components of the present invention within the broad and preferred ranges described herein is important to obtaining the difficult to achieve combinations of properties exhibited by the present compositions, particularly in the preferred systems and methods, and that use of these same components but substantially outside of the identified ranges can have a deleterious effect on one or more of the important properties of the compositions of the invention. In highly preferred embodiments, highly preferred combinations of properties are achieved for compositions having a weight ratio of HFC-134a:HFC-1234ze, and preferably of transHFC-1234ze, of from about 0.6:1 to about 1:0.9, with a ratio of from about 0.65:1 to about 1:1 being preferred in certain embodiments. Applicants have found that highly preferred combinations of properties are also achieved for compositions having a weight ratio of HFO-1234ze:HFO-1234yf of from about 6:1 to about 3:1, with a ratio of from about 5:1 to about 4:1 being preferred in certain embodiments.

For the purposes of convenience, the combination HFO-1234ze and HFO-1234yf is referred to herein as the "tetrafluoropropene component" or "TFC," and in certain embodiments highly preferred combinations of properties can be achieved for composition which comprise a weight ratio of HFC-134a:TFC of from about 0.6:1 to about 1:0.9, with a ratio of from about 0.65:1 to about 1:1 being preferred in certain embodiments.

Although it is contemplated that either isomer of HFO-1234ze may be used to advantage in certain aspects of the present invention, applicants have found that it is preferred in certain embodiments that the HFO-1234ze comprise transHFO-1234ze, and preferably comprise transHFO-1234ze in major proportion, and in certain embodiments consist essentially of transHFO-1234ze.

As mentioned above, applicants have found that the compositions of the present invention are capable of achieving a difficult combination of properties, including particularly low GWP. By way of non-limiting example, the following Table A illustrates the substantial improvement the GWP of certain compositions of the present invention in comparison to the GWP of HFC-134a, which has a GWP of 1430.

TABLE A

| Composition of the Invention (weight fraction, based on identified components) | Name | GWP | GWP as a Percentage of R134a GWP |
|---|---|---|---|
| R134a | R134a | 1430 | 100% |
| R134a/trans1234ze (0.42/0.58) | A1 | 604 | 42% |
| R134a/trans1234ze/1234yf (0.42/0.48/0.10) | A2 | 604 | 42% |
| R134a/trans1234ze/1234yf (0.42/0.40/0.18) | A3 | 604 | 42% |

The compositions of the present invention may include other components for the purpose of enhancing or providing certain functionality to the composition, or in some cases to reduce the cost of the composition. For example, the present compositions may include co-refrigerants, lubricants, stabilizers, metal passivators, corrosion inhibitors, flammability suppressants, and other compounds and/or components, and the presence of all such compounds and components is within the broad scope of the invention.

In certain preferred embodiments, the refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent. Furthermore, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

In certain preferred embodiments, the present compositions include, in addition to the compounds described above, one or more of the following as co-refrigerant:

Trichlorofluoromethane (CFC-11)
Dichlorodifluoromethane (CFC-12)
Difluoromethane (HFC-32)
Pentafluoroethane (HFC-125)
1,1,2,2-tetrafluoroethane (HFC-134)
Difluoroethane (HFC-152a)
1,1,1,2,3,3,3-Heptafluoropropane (HFC-227ea)

1,1,1,3,3,3-hexafluoropropane (HFC-236fa)
1,1,1,3,3-pentafluoropropane (HFC-245fa)
1,1,1,3,3-pentafluorobutane (HFC-365mfc)
water
$CO_2$ Of course, other co-refrigerants may be used in addition to or instead of any or more of the above-notes examples.

Heat Transfer Methods and Systems

The preferred heat transfer methods generally comprise providing a composition of the present invention and causing heat to be transferred to or from the composition, either by sensible heat transfer, phase change heat transfer, or a combination of these. For example, in certain preferred embodiments the present methods provide refrigeration systems comprising a refrigerant of the present invention and methods of producing heating or cooling by condensing and/or evaporating a composition of the present invention. In certain preferred embodiments, the systems and methods for heating and/or cooling, including cooling of other fluid either directly or indirectly or a body directly or indirectly comprise compressing a refrigerant composition of the present invention and thereafter evaporating said refrigerant composition in the vicinity of the article to be cooled. As used herein, the term "body" is intended to refer not only to inanimate objects but also to living tissue, including animal tissue in general and human tissue in particular. For example, certain aspects of the present invention involve application of the present composition to human tissue for one or more therapeutic purposes, such as a pain killing technique, as a preparatory anesthetic, or as part of a therapy involving reducing the temperature of the body being treated. In certain embodiments, the application to the body comprises providing the present compositions in liquid form under pressure, preferably in a pressurized container having a one-way discharge valve and/or nozzle, and releasing the liquid from the pressurized container by spraying or otherwise applying the composition to the body. As the liquid evaporates from the surface being sprayed, the surface cools.

Certain preferred methods for heating a fluid or body comprise condensing a refrigerant composition comprising a composition of the present invention in the vicinity of the fluid or body to be heated and thereafter evaporating said refrigerant composition. In light of the disclosure herein, those of skill in the art will be readily able to heat and cool articles according to the present inventions without undue experimentation.

In certain embodiments the present invention provides cooling by absorbing heat from a fluid or body, preferably by evaporating the present refrigerant composition in the vicinity of the body or fluid to be cooled to produce vapor comprising the present composition. Certain preferred method and system aspects of the present invention can be illustrated with respect to the simplified flow diagram provided in FIG. 1. In such preferred methods/systems, the refrigeration systems/methods comprise introducing a refrigerant of the present invention, preferably through a suction line 1, so as to compresses the refrigerant vapor, usually with a compressor or similar equipment, to produce vapor of the present composition at a relatively elevated pressure in a discharge line 2. Generally, the step of compressing the vapor results in the addition of heat to the vapor, thus causing an increase in the temperature of the relatively high pressure vapor. Preferably in such embodiments the present methods include removing from this relatively high temperature, high pressure vapor at least a portion of the heat added by the evaporation and/or compression steps. The heat removal step preferably includes condensing the high temperature, high pressure vapor, preferably through a compressor discharge line 2 into a condenser while the vapor is in a relatively high pressure condition, with the result of producing a relatively high pressure liquid comprising a composition of the present invention. This relatively high pressure liquid preferably then undergoes a nominally isoenthalpic reduction in pressure to produce a relatively low temperature, low pressure liquid. In the embodiment illustrated in FIG. 1, this is achieved by introducing the liquid from the condenser through the condenser discharge line 3 into expansion device, such as an expansion valve. In such embodiments, it is this reduced pressure/temperature refrigerant liquid which is then vaporized by heat transferred from the body or fluid to be cooled. For example, in the embodiment illustrated in FIG. 1, low-temperature, low pressure liquid from the expansion device introduced through discharge line 4 into an evaporator, wherein heat is transferred from the body or fluid to be cooled into the refrigerant fluid. The cycle then repeats as the discharge from the evaporator is introduced back into the compressor.

Figure 1:
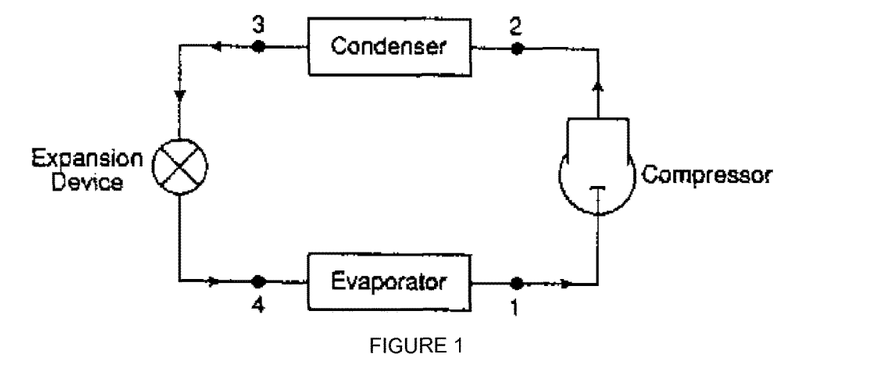
FIG. 1 is a schematic representation of a simple vapor compression heat transfer cycle.
Figure 2:
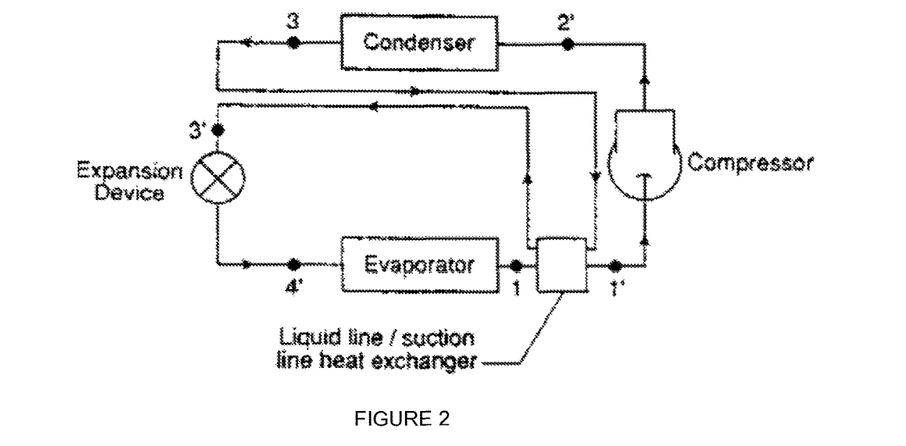
FIG. 2 is a schematic representation of a vapor compressions heat transfer cycle having a liquid line/suction line heat exchanger.

Another preferred embodiment of the present invention involves a variation of the basic type of system/method described in connection with FIG. 1. Such a preferred embodiment incorporates an additional heat exchange unit which is commonly known as a suction line/liquid line heat exchanger, also known as a "SL-LL heat exchanger." A simplified flow diagram illustrating diagramatically methods/systems which utilize such an arrangement is provided in FIG. 2. Such preferred systems/methods operate using the same components substantially as described above, with the exception that an additional heat exchange unit is included in the system between the evaporator and the compressor whereby at least a portion of the liquid discharged from the condenser, for example in discharge line 3, is diverted to be further cooled by absorbing heat from at least a portion of the discharge from the evaporator. Applicants have found that the compositions of the present invention produce unexpectedly advantageous and surprisingly beneficial results when used in connection with heat transfer systems containing an SL-LL heat exchanger. In certain embodiments, such advantage and benefit occurs in connection with improved system capacity and efficiency, and beneficial lowering of compressor discharge temperature.

In another process embodiment of the invention, the compositions of the invention may be used in a method for producing heating which comprises condensing a refrigerant comprising the compositions in the vicinity of a liquid or body to be heated. Such methods, as mentioned hereinbefore, frequently are reverse cycles to the refrigeration cycle described above. One example of such an embodiment which may be used to produce heat and/or cooling are certain types of devices known as heat pumps. Although such devices are available for use, and have been used, to heat and/or cool many types of fluids or other materials, in certain preferred embodiments the heat pumps of the present invention are utilized to heat and/or cool water, and preferably domestic water.

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, R-134a. The preferred compositions of the present invention tend to exhibit many of the desirable characteristics of R-134a but which has a GWP that is substantially lower than that of R-134a while at the same time having a capacity that is substantially similar to or substantially matches, and preferably is as high as or higher than R-134a. In particular, applicants have recognized that certain preferred embodiments of the present compositions tend to exhibit relatively low global warming potentials ("GWPs"), preferably less than about 1500, more preferably less than about 1000, and even more preferably not greater than about 650.

In certain other preferred embodiments, the present compositions are used in refrigeration systems originally designed for use with R-134a. Applicants have found that in the systems and methods of the present invention many of the important refrigeration system performance parameters are relatively close to, and in certain important cases unexpectedly superior to, the parameters for R-134a. Since many existing refrigeration systems have been designed for R-134a, or for other refrigerants with properties similar to R-134a, those skilled in the art will appreciate the substantial advantage of a low GWP and/or a low ozone depleting refrigerant that can be used as replacement for R-134a or like refrigerants with relatively minimal modifications to the system. It is contemplated that in certain embodiments the present invention provides retrofitting methods which comprise replacing the heat transfer fluid (such as a refrigerant) in an existing system with a composition of the present invention, without substantial modification of the system. In certain preferred embodiments the replacement step is a drop-in replacement in the sense that no substantial redesign of the system is required and no major item of equipment needs to be replaced in order to accommodate the composition of the present invention as the heat transfer fluid.

In certain preferred embodiments, the methods comprise a drop-in replacement in which the energy usage of the system is at least about 1% less, and even more preferably at least about 2% less than the operation of the same system using HFC-134a.

Preferred refrigeration compositions of the present invention may be used in refrigeration systems containing a lubricant used conventionally with R-134a, such as mineral oils, polyalkylbenzene, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers (including chillers using centrifugal compressors), and the like.

As mentioned above, the compositions, systems and methods of the present invention are generally adaptable for use in connection with all types and varieties of heat exchange equipment, and all such compositions, methods and systems are within the scope of the present invention. In certain preferred embodiments, however, the present compositions are particularly advantageous for use in connection with certain vapor compression heat exchange systems which are sometimes referred to as "small refrigeration systems." For the purposes of the present disclosure, is preferred that such "small refrigeration systems" refer to vapor compression refrigeration systems which utilize one or more compressors and operate at external ambient temperatures ranging from 20° C. to about 65° C. In preferred embodiments of such systems, the systems have a refrigerated ambient temperature of from about −30° C. to about 5° C.

EXAMPLES

The following examples are provided for the purpose of illustrating the present invention but without limiting the scope thereof.

Example 1

Small Refrigeration System

The energy consumption (EC) is an accepted measure of refrigerant performance for small refrigeration systems. EC represents the amount of energy consumed by the system over a predetermined period of time and for specific operating conditions. One means for estimating EC of a refrigerant at specific operating conditions is from ANSI/AHAM HRF-1-2007 Standard, which is mentioned above and incorporated herein by reference.

A small refrigeration system is provided. An example of such a system includes a domestic refrigerator as illustrated in this Example. The outdoor ambient temperature is about 32.2° C. (+/−1° C.). The freezer temperature is about −17° C. The test procedure is as follows:

The whole refrigerator is allowed to have an equilibrium temperature of 32.2° C. for at least 24 h previous to the test.

The refrigerator doors are closed and the system is started.

Data is collected for a period of at least 48 hours, which is known as the "pull-down" period which goes until the desired freezer temperature is reached. This 48 hours also covers a period during which the refrigeration system is cycling.

The power consumption, freezer and cabinet (fresh food compartment) temperatures as well as external ambient temperatures are recorded.

Several operating parameters are determined for the compositions A1-A2 identified in Table A above in accordance with this test, and these operating parameters are reported in Table 1 below, based upon HFC-134a having an energy consumption value of 100%.

TABLE 1

| Name | Freezer Temp (C.) | Cabinet Temp (C.) | Room Temp (C.) | kW-H | EC |
|---|---|---|---|---|---|
| R134a | −17.2 | 2.2 | 31.8 | 1.687 | 100% |
| A1 | −17.0 | 1.9 | 32.0 | 1.71 | 101.3% |
| A2 | −16.9 | 2.1 | 32.2 | 1.654 | 98.0% |

As can be seen from the Table 1 above, applicants have found that the compositions of the present invention are capable of at once achieving many of the important refrigeration system performance parameters close to the parameters for R-134a, and in particular sufficiently close to permit such compositions to be used as a drop-in replacement for R-134a in small refrigeration systems and/or for use in such existing systems with only minor system modification. For example, compositions A2 exhibits an EC that is approximately 2% lower than the EC of R-134a in this system, which is a very significant improvement in energy consumption. Such reductions of EC are environmentally significant for domestic refrigerators, vending machines and auto air conditioners due to their widespread use. Furthermore, each of the compositions A1 and A2 is a Class 1 composition and therefore highly desirable from a non-flammability standpoint.

Example 2

Air Conditioning

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

An air conditioning cycle system is provided where the condenser temperature is about 45° C. and the evaporator temperature is about 7° C. under 70% of isoentropic compression efficiency and 100% of volumetric efficiency. The degree of superheat is about 5° C. and the degree of sub-cooling about 5° C. COP is determined for compositions A1-A3 of the present invention reported in Table 2 below, based upon HFC-134a having a COP value of 100%, a capacity value of 100% and a relative discharge temperature compared to R134a.

Example 3

HFC-134a Replacements—Medium Temperature, Automotive Air Conditioner, Chiller Systems and Heat Pump This example illustrates the performance of one embodiment of the present invention in which the refrigerant composition is as indicated as A1-A3 in Table A and is used as a replacement for HFC-134a in four systems. The first system is one having an evaporator temperature (ET) of about −7° C. and condenser temperature (CT) of about 54° C. (Example 3A). For the purposes of convenience, such heat transfer systems, that is, systems having an ET of from about −18° C. to about 2° C. and a CT of from about 27° C. to about 66° C., are referred to herein as "medium temperature" systems. The second system is one having an ET of about of 2° C. and a CT of about 66° C. (Example 3B). For the purposes of convenience, such heat transfer systems, that is, systems having an evaporator temperature of from about 1° C. to about 16° C. and a CT of from about 32° C. to about 93° C., are referred to herein as "automotive AC" systems. The third system is one having an ET of about 4° C. and a CT of about 16° C. (Example 3C). For the purposes of convenience, such heat transfer systems, that is, systems having an evaporator temperature of from about 2° C. to about 10° C. and a CT of from about 27° C. to about 149° C., are referred to herein as "chiller" or "chiller AC" systems The fourth system is one having an ET of about of 0° C., a source temperature (SRT) of about 5° C., a CT of about 60° C., and a sink temperature (SKT) of about 55° C. (Example 3D). For the purposes of convenience, such heat transfer systems, that is, systems having an ET of from about −5° C. to about 5° C., an SRT of from about 0° C. to about 10° C., a CT of from about 50° C. to about 70° C., and an SKT of from about 45° C. to about 65° C. are referred to herein as "domestic water heater heat pump" systems. The operation of each of such systems using R-134a and the designated refrigerant composition of the present invention is reported in Tables 3A-3D below:

TABLE 2

| Refrigerant | Capacity % | COP % | Suction P % | Disch. P % | Diff Disch T ° C. | Flow % | Superheat (based on drop-in replacement) ° C. |
|---|---|---|---|---|---|---|---|
| R134a | 100% | 100% | 100% | 100% | 0.00 | 100% | 5.0 |
| A1 | 90% | 100% | 91% | 91% | −3.75 | 96% | 2.2 |
| A2 | 94% | 99% | 96% | 95% | −4.01 | 103% | 3.8 |
| A3 | 96% | 99% | 100% | 99% | −4.32 | 108% | 5.0 |

TABLE 3A

Medium Temp Conditions −6.66° C. ET and 54.44° C. CT

| Refrigerant | Capacity % | COP % | Suction P % | Disch. P % | Diff Disch T ° C. | Flow % | Superheat (based on drop-in replacement) ° C. |
|---|---|---|---|---|---|---|---|
| R134a | 100% | 100% | 100% | 100% | 0.00 | 100% | 5.0 |
| A1 | 88% | 99% | 90% | 91% | −6.42 | 96% | 2.5 |
| A2 | 92% | 98% | 96% | 95% | −6.88 | 103% | 4.0 |
| A3 | 94% | 97% | 101% | 98% | −7.34 | 108% | 5.2 |

As can be seen from the table above, the compositions of the present invention, particularly A3, exhibit a good capacity and efficiency match to HFC-134a in such systems. Furthermore, the level of superheat is at about the same level as for HFC-134a, indicating that a change of the expansion device would not be required. Similar pressures and mass flow allow the use of same compressor. Lower discharge temperature allows the use of SL-LL heat exchanger which will further improve capacity and efficiency.

TABLE 3B

Auto AC Temp Conditions 2° C. ET and 5.55° C. CT

| Refrigerant | Capacity % | COP % | Suction P % | Disch. P % | Diff Disch T ° C. | Flow % | Superheat (based on drop-in replacement) ° C. | Cap Heating % | Eff Heating % |
|---|---|---|---|---|---|---|---|---|---|
| R134a | 100% | 100% | 100% | 100% | 0.00 | 100% | 5.0 | 100% | 100% |
| A1 | 88% | 98% | 90% | 91% | −6.07 | 96% | 2.3 | 99% | 88% |
| A2 | 91% | 97% | 96% | 95% | −6.44 | 103% | 3.9 | 98% | 92% |
| A3 | 93% | 96% | 100% | 98% | −6.83 | 108% | 5.1 | 97% | 94% |

As can be seen from the table above, the compositions of the present invention, particularly A3, exhibit a good capacity and efficiency match to HFC-134a in such systems. Furthermore, the level of superheat is at about the same level as for HFC-134a, indicating that a change of the expansion device would not be required. Similar pressures and mass flow allow the use of same compressor. Lower discharge temperature allows the use of SL-LL heat exchanger which will further improve capacity and efficiency.

TABLE 3C

Chiller Temp Conditions 4.44° C. ET and 35° F. CT

| Refrigerant | Capacity % | COP % | Suction P % | Disch. P % | Diff Disch T ° C. | Flow % | New Superheat ° C. |
|---|---|---|---|---|---|---|---|
| R134a | 100% | 100% | 100% | 100% | 0.00 | 100% | 5.0 |
| A1 | 90% | 100% | 91% | 91% | −3.11 | 96% | 2.3 |
| A2 | 94% | 99% | 96% | 96% | −3.34 | 103% | 3.8 |
| A3 | 97% | 99% | 101% | 99% | −3.63 | 108% | 5.0 |

As can be seen from the table above, the compositions of the present invention, particularly A3, exhibit a good capacity and efficiency match to HFC-134a in such systems. Furthermore, the level of superheat is at about the same level as for HFC-134a, indicating that a change of the expansion device would not be required. Similar pressures and mass flow allow the use of same compressor. Lower discharge temperature allows the use of SL-LL heat exchanger which will further improve capacity and efficiency.

TABLE 3D

Heat Pump Temp Conditions 0° C. ET (5° C. Source) and 60° C. CT (55° C. Sink)

| Refrigerant | Cap % | Eff % | Suction P % | Disch Disch. P % | Diff T ° C. | Flow % | New Superheat ° C. |
|---|---|---|---|---|---|---|---|
| R134a | 100% | 100% | 100% | 100% | 0.00 | 100% | 5.0 |
| A1 | 99% | 89% | 90% | 91% | −5.93 | 96% | 2.4 |
| A2 | 98% | 92% | 96% | 95% | −6.31 | 103% | 3.9 |
| A3 | 98% | 95% | 101% | 98% | −6.72 | 108% | 5.1 |

The above table illustrate a common domestic heat pump water heater system (HPWH), which heretofore have frequently used R-134a as refrigerant. The above table depicts performance for a typical HPWH using a 5° C. temperature difference (TD) between source and evaporating and sink and condensing temperatures respectively. As can be seen from the table above, the compositions of the present invention, particularly A3, exhibit a good capacity and efficiency match to HFC-134a in such systems. Furthermore, the level of superheat is at about the same level as for HFC-134a, indicating that a change of the expansion device would not be required. Similar pressures and mass flow allow the use of same compressor. Lower discharge temperature allows the use of SL-LL heat exchanger which will further improve capacity and efficiency.

Example 4

Methods and Systems Using SL-LL Heat Exchanger

This example illustrates the performance of three embodiments of the present invention in which the refrigerant composition is as indicated as A1, A2 and A3 in Table A and compared to the use of three refrigerants, namely, HFC-134a, HFO-1234yf and HFO-1234ze. The system is a vapor compression refrigeration system having a compressor, evaporator, condenser, isenthalpic expansion device, and a liquid-line/suction-line heat exchanger. The system is in the form of a domestic refrigerator with an volume of about 363.4 liters, and has an air-cooled condenser and a forced-convection evaporator. The compressor is a 7.5 cc displacement compressor. The system uses a capillary tube SL-LL heat exchanger that exchanges heat with the compressor suction line. Substantially steady operating conditions are tested, with an ambient temperature of about 32.2° C. and a relative humidity of about 50%. The freezer temperature is about −15° C. The compressor suction temperature is about 32.2° C. The evaporator superheat is about 5° C., and the condenser subcooling is about 2° C. The GWP, capacity (relative to HFC-134a), efficiency (relative to HFC-134a), mass flow (relative to HFC-134a), suction pressure:discharge pressure ratio (relative to HFC-134a), and discharge temperature (relative to HFC-134a) are observed and reported in Table 4 below:

TABLE 4

| Refrigerant | GWP | Cap. | Eff. | Mass Flow | Pd/Ps | ΔTd (° C.) |
|---|---|---|---|---|---|---|
| 134a | 1430 | 100% | 100% | 100% | 100% | 0.0 |
| 1234yf (Drop-in) | 4 | 107% | 102% | 129% | 88% | −16.7 |
| 1234ze (Drop-in) | 6 | 70% | 101% | 76% | 107% | −10.9 |
| A1: 1234ze/134a (58/42) | 604 | 90% | 101% | 96% | 101% | −7.1 |
| A2: 134a/1234ze/1234yf(42/48/10) | 604 | 96% | 101% | 103% | 99% | −8.0 |
| A3: 134a/1234ze/1234yf(42/40/18) | 604 | 100% | 101% | 109% | 97% | −8.5 |

Based on the above Table 4, 1234yf alone is a relatively close match to HFC-134a in terms of capacity and efficiency while also producing an excellent GWP value. However, applicants note that in such a systems the mass flow is substantially greater, which indicates that changes would likely need to be made to the SL-LL heat exchanger, and/or the expansion device and/or the compressor. With respect to HFO-1234ze, this fluid results in a capacity that is only 70% of the capacity of HFC-134a under drop-in conditions. This means that the system would have to be modified to utilize a compressor having an approximately 55% larger displacement, and the substantial mass flow reduction indicates that substantial modifications in the capillary tube heat exchanger would be required. Furthermore, neither HFO-1234ze nor HFO-1234yf are Class 1 materials. In contrast, the compositions A1, A2 and A3 according to the present invention are at once Class 1 materials, notwithstanding that HFO-1234yf and HFO-1234ze are included, and each is also an excellent match to R-134a in the parameters of capacity, efficiency and mass flow. Furthermore, each of the present compositions provide a reduced compression ratio and reduced discharge temperature, as well as slightly better efficiency than R134a.

As can be seen generally from the above disclosure, many of the important refrigeration system performance parameters of the compositions of the present are relatively close to the parameters for R-134a. Since many existing refrigeration systems have been designed for R-134a, or for other refrigerants with properties similar to R-134a, those skilled in the art will appreciate the substantial advantage of a low GWP and/or a low ozone depleting and/or Class 1 refrigerant that can be used as replacement for R-134a or like refrigerants with relatively minimal modifications, or no substantial modifications, to the system. It is contemplated that in certain embodiments the present invention provides retrofitting methods which comprise replacing the refrigerant in an existing system with a composition of the present invention without substantial modification and/or replacement of any of the major equipment of the system. In certain preferred embodiments the replacement step is a drop-in replacement in the sense that no substantial redesign of the system is required and no major item of equipment needs to be replaced in order to accommodate the refrigerant of the present invention.

What is claimed is:

1. A method of providing cooling in a medium temperature refrigeration system having an evaporator temperature (ET) of from about −18° C. to about 2° C. and condenser temperature (CT) of from about 27° C. to about 66° C. comprising introducing into said system a refrigerant comprising: (a) about 42% by weight of HFC-134a; and (b) about 58% by weight of HFO1234ze, wherein said HFO-1234ze consists essentially of trans-HFO-1234ze.

2. The method of claim 1 wherein said HFO-1234ze consists of trans-HFO-1234ze.

3. The method of claim 1 wherein said medium temperature system is included in one or more of a system selected from stationary air conditioner, domestic refrigerator/freezer, chiller, and vending machine.

4. The method of claim 1 wherein said system is included in one or more of a system selected from stationary air conditioner, domestic refrigerator/freezer, chiller, and vending machine.

5. A heat transfer system comprising a compressor, a condenser and an evaporator in fluid communication and operating with an evaporator temperature (ET) of from about −18° C. to about 2° C. and condenser temperature (CT) of from about 27° C. to about66° C., and a refrigerant in said system, said refrigerant comprising: (a) about 42% by weight of HFC-134a; and (b) about 58% by weight of HFO1234ze, wherein said HFO-1234ze consists essentially of trans-HFO-1234ze.

6. The system of claim 5 wherein said HFO-1234ze consists of trans-HFO-1234ze.

7. The heat transfer system of claim 6 having an external ambient operating temperature of from about 20° C. to about 65° C.

8. The heat transfer system of claim 6 having a refrigerated ambient operating temperature of from about −30° C. to about 5° C.

9. The system of claim 5 wherein said refrigeration system is included in at least one member of the group consisting of stationary air conditioner, domestic refrigerator/freezer, chiller and vending machine.

10. A method of providing cooling in a heat transfer system including a compressor, a condenser, an evaporator and a liquid-line/suction line heat exchanger, comprising introducing into said system a refrigerant comprising: (a) about 42% by weight of HFC-134a; and (b) about 58% by weight of HFO1234ze, wherein said HFO-1234ze consists essentially of trans-HFO-1234ze.

11. The method of claim 10 wherein said system is included in a domestic refrigerator.

12. The method of claim 10 wherein said HFO-1234ze consists of trans-HFO-1234ze.

* * * * *